Aug. 1, 1950  F. DERBENWICK ET AL  2,516,963
CENTRIFUGAL PITTER FOR FRUIT
Filed April 28, 1947  2 Sheets-Sheet 2
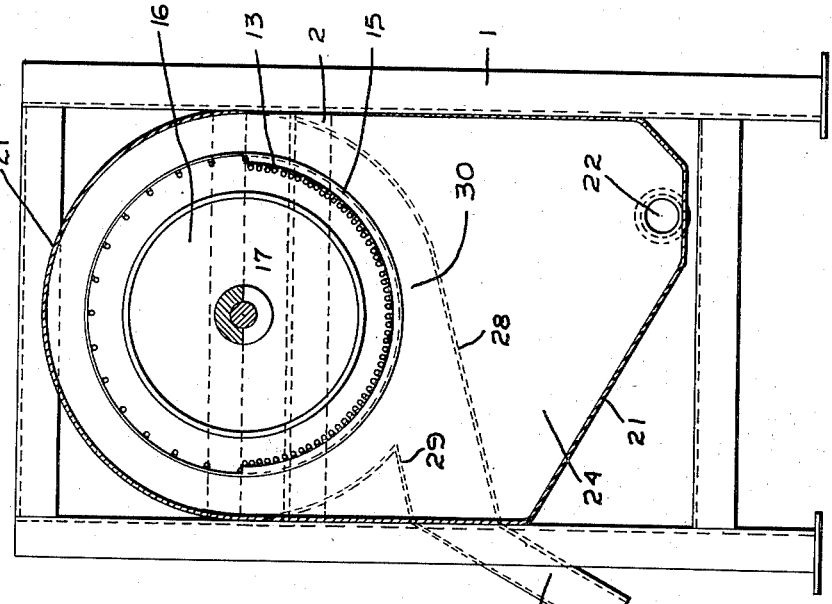
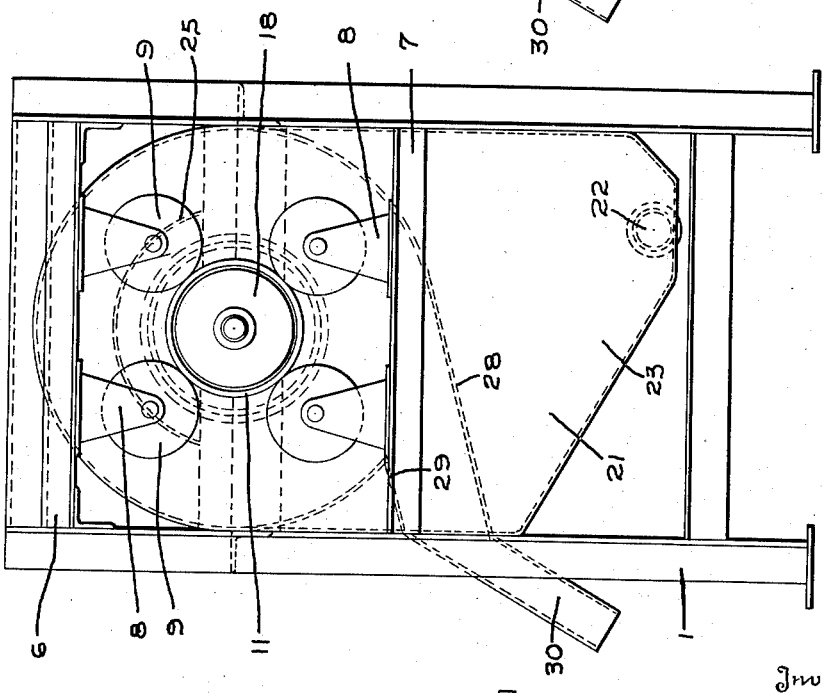
Inventor
FRANK DERBENWICK
JAMES F. RYAN, JR.
NORMAN C. CALHOUN
By Semmes, Keogin, Robinson + Semmes
Attorneys Patented Aug. 1, 1950

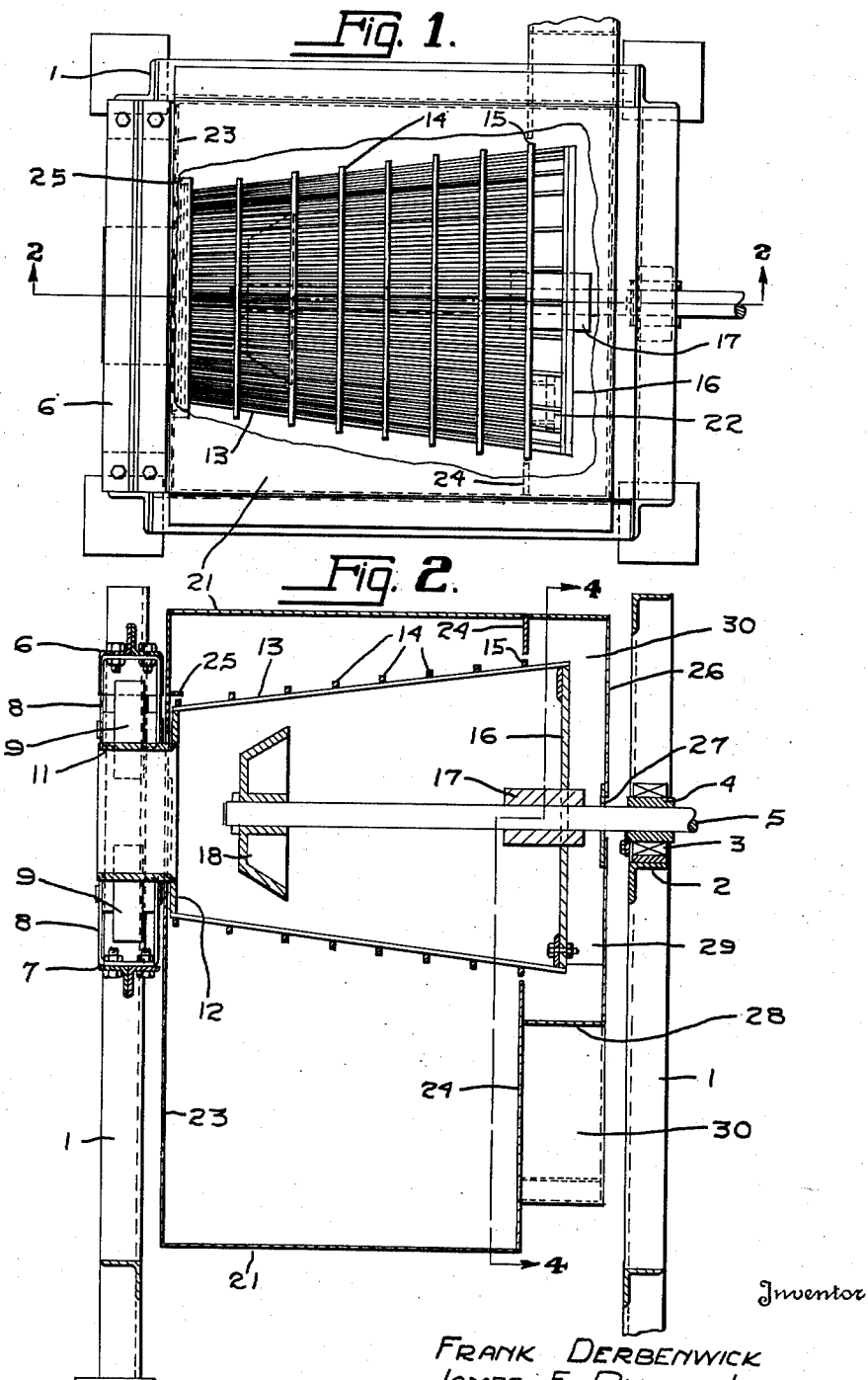

2,516,963

UNITED STATES PATENT OFFICE 2,516,963

CENTRIFUGAL PITTER FOR FRUIT

Frank Derbenwick, Oakland, James F. Ryan, Jr., San Leandro, and Norman C. Calhoun, Oakland, Calif., assignors to Gerber Products Company, Fremont, Mich., a corporation of Michigan Application April 28, 1947, Serial No. 744,451

3 Claims. (Cl. 146—17)

This invention relates to machines and a method for removing the stones or pits from fruit.

Fruits having stones in their centers, that is drupes, are conventionally pitted by machines which slice the fruit in half and then remove the stones. When the meat of the fruit is to be used as a pulp, however, the fruit is usually put through a pulper in which revolving paddles, teeth or brushes knock the meat off the pits and either force the meat through a screen or the mixture is passed to a revolving screen which permits the pits to pass through its mesh and retains the meat. These pulpers are not satisfactory because their paddles batter the pits so badly that particles of the pits are usually broken off and mingle with the pulp, thereby making an inferior product. Pulpers which pass the pits through a revolving screen also have the disadvantage that the step of separating the pit from the flesh is not very efficient, since a screen having a mesh large enough to pass the pits will also pass a substantial amount of the pulp.

An object of this invention is to provide a machine for separating the flesh from the stones of drupaceous fruit efficiently, so that the stones and the flesh are completely separated.

Another object is to provide a machine for removing the meat from stone fruit which leaves the stones whole and does not break particles from them.

A further object is to provide a fruit pitter which separates the pulp from the pits of drupaceous fruit by the use of centrifugal force so that the pitter may be constructed in either a horizontal or a vertical position.

Still another object of the invention is to provide a fruit pitter which is compact and occupies a small space, yet has a high capacity.

A further object is to provide a fruit pitter of such simple construction that it is practically impossible for the pitter to get out of order.

In the drawings,

Figure 1 is a plan view, partly broken away, representing one form of fruit pitter constructed in accordance with this invention;

Figure 2 is a vertical section on the line 2—2 of Figure 1;

Figure 3 is an end elevation of the machine, viewed from the feed end, which is at the left in Figures 1 and 2, showing the arrangement of the supporting rollers; and Figure 4 is a vertical sectional view on the line 4—4 of Figure 2.

The pitter is illustrated as having its axis horizontal and is mounted in a suitable frame 1, having, for example, vertical angle iron supports and a horizontal shaft-supporting member 2. The latter member supports a bearing 3 containing bushing 4 inside which shaft 5 of the machine rotates. At the other end of the machine, the frame has upper and lower horizontal members 6 and 7, to which are attached four pairs of webs 8, each pair of webs supporting one roller 9. The rollers are supported by the pairs of webs 8 extending downwardly from member 6 and upwardly from member 7 and are so spaced as to support evenly from four equally spaced positions the cylindrical bearing surface of a tubular feed opening 11, whose interior constitutes the feeding end of the pitter and which is suitably secured, as by welding, to an annular end member 12 of the pitter basket. To the circular circumference of this end member, completely around its circumference are secured a number of rods or bars 13, which are closely spaced and extend longitudinally of the machine at such an angle that they form a basket of frusto-conical shape, the space between rods, laths or slats 13 gradually increasing from the feed end of the machine, at member 12, to the pit delivery end. Rods 13 may be of any suitable material, but preferably are of a non-corrosive metal such as brass or stainless steel. The rods are braced in proper position against the action of centrifugal force by a plurality of longitudinally spaced, circumferential rings 14, which may be held in their proper longitudinal positions by any suitable means, as by soldering or tack welding them to two or more rods 13. The majority of the rods end at the last ring 15, but a few of them extend beyond the last ring and are secured at their ends to a circular end plate 16. The latter is attached in its center to a hub 17 which is carried by the shaft 5 and is keyed to or shrunk on the shaft so as to be driven thereby. The shaft extends inside the basket, beyond hub 17 near the feed opening 11 and carries on its end a cup-shaped baffle plate 18, whose convex side faces toward the feed opening so as to guide the fruit to be treated outwardly toward the rods 13.

Enclosing the basket is a suitably spaced hood 21, which may have a removable top and envelops the basket completely so as to stop particles of fruit pulp and pits which fly outwardly from the basket during its rotation. The hood is suitably supported by frame 1 and is made in two parts, the first being much the larger for collecting the separated pulp in its bottom, which forms a bin from which the pulp passes through outlet 22. The end wall 23 on the feeding end of the pulp-collecting part of the hood has a circular aperture which is spaced closely about the cylindrical bearing surface of feed opening 11 adjacent annular end member 12 of the basket. The other end wall 24 of the first part of the hood is in the same plane as the last ring 15 surrounding rods 13 and is closely spaced peripherally about ring 15 so that all of the pulp escaping between rods 13 is confined within the first part of the hood. In order to prevent any pulp from falling onto the bearing surface at the feed end, a semi-circular shield 25 is attached to end wall 23 and extends over the basket to a point just beyond end member 12 of the basket.

The pit-collecting part of hood 21 is at the end remote from feed opening 11. It includes a flat end plate 26 having a circular aperture spaced closely about shaft 5, which carries an annular fin 27 positioned closely adjacent plate 26 and thereby preventing pits from falling into the shaft aperture in the plate. Pate 26 is joined at its lower side to end wall 24 of the pulp-collecting bin by bottom plates 28 and 29 which form, with end wall 24, and plate 26 and other suitable end walls, a pit delivery chute 30. The pits pass from the basket between the widely spaced ends of those rods 13 which extend between last ring 15 and circular end plate 16 of the basket.

In operation, drupaceous or stone-containing fruit are placed in the pitter through feed opening 11. Examples of such fruit are peaches, plums, prunes, cherries, apricots, dates and olives. The operation of the machine will be described in connection with its use for pitting peaches. The basket of the machine is rotated at a high rate of speed by shaft 5, which is connected to a motor or other suitable source of power, not shown. As the peaches pass beyond the inner surface of cylindrical feed opening 11, they are thrown outwardly toward the rods 13 by centrifugal force. They are tumbled and rolled somewhat by rods 13 so that the rods cut into their flesh and centrifugal force tears the flesh from the pits or stones. The severed flesh is thrown by centrifugal force outwardly through the slots between rods 13 but the pits are held within the basket by the rods as the slots are not wide enough to permit the pits to pass therethrough. Baffle plate 18 serves to ensure that the peaches will be directed outwardly to rods 13 at the feed end of those rods and is especially useful for that purpose when a large number of peaches, under force of gravity or other compulsion, enter feed opening 11. Because of the slope of rods 13, the peach stones, with a diminishing amount of flesh adhering thereon, tumble and slide along the rods away from the feed end. By the time they reach a position adjacent to last ring 15, the flesh has been substantially removed therefrom and the stones or pits then pass outwardly from the basket between the widely spaced ends of rods 13 located between last ring 15 and end plate 16. The stones or pits fall into chute 30 and are delivered therethrough from the machine.

It is apparent that there is provided herein a machine for pitting drupaceous fruit which is simple in construction and reliable in operation. The machine operates continuously and has a high capacity, while at the same time it is compact and occupies a small amount of floor space. The pulp of the fruit is removed efficiently from the pit. The pit is not broken off and hence parts from it do not contaminate the pulp.

Since the operation of this machine does not depend in any way upon the force of gravity, the machine may be constructed with its axis vertical rather than horizontal.

The slope, size and spacing of rods 13 which form the pitter basket vary according to the particular fruit being pitted. A certain slope is most effective for pitting a given kind of fruit. The optimum slope also varies according to the degree of blanching or precooking to which the fruit is subjected prior to pitting and, furthermore, depends somewhat upon the speed of rotation of the basket. The rod spacing may be varied according to the size of the stone or pit in the particular fruit being pitted. The speed of rotation of the shaft will also be selected to be the most appropriate speed for the particular material being treated.

We claim:

1. A machine for the removal of pits from fruits containing pits comprising a frame, a conical cylinder mounted for rotation in said frame, a plurality of bars spaced to prevent passage of the fruit pits therebetween extending longitudinally of the cylinder to form its outer surface, an inlet tube extending into and supporting one end of the cylinder, rollers supported by the frame engaging the outer surface of the inlet tube, a shaft adapted to rotate the cylinder extending from the end of the cylinder remote from the inlet tube through the cylinder to a position in the region of the inlet tube, a baffle on the end of the shaft in the region of the inlet tube to direct the fruit toward the walls of the cylinder, and means to rotate the shaft whereby the fruit is thrown outwardly against the rods which prevent further outward movement of the pits to remove the flesh of the fruit from the pits.

2. A machine for the removal of pits from fruits containing pits comprising a frame, a conical cylinder mounted for rotation in said frame, a plurality of bars spaced to prevent passage of the fruit pits therebetween extending longitudinally of the cylinder to form its outer surface, an inlet tube extending into one end of the cylinder, rollers supported by the frame engaging the outer surface of the inlet tube, a shaft adapted to rotate the cylinder extending from the end of the cylinder remote from the inlet tube through the cylinder to a position in the region of the inlet tube, a baffle on the end of the shaft in the region of the opening to direct the fruit toward the walls of the cylinder, means to rotate the shaft whereby the fruit is thrown outwardly against the rods which prevent further outward movement of the pits to remove the flesh of the fruit from the pits, and a hood surrounding the cylinder for the collection of the fruit.

3. A machine for the removal of pits from fruits containing pits comprising a frame, a conical cylinder mounted for rotation in said frame, a plurality of bars spaced to prevent passage of the fruit pits therebetween extending longitudinally of the cylinder to form its outer surface, an inlet tube extending into one end of the cylinder, rollers supported by the frame engaging the outer surface of the inlet tube, certain of said bars being short to provide enlarged spaces between adjacent bars at the end remote from the opening, a baffle on the end of the shaft in the region of the opening to direct the fruit toward the walls of the cylinder, and means to rotate the shaft whereby the fruit is thrown outwardly against the rods which prevent further outward movement of the pits to remove the flesh of the fruit from the pits, said pits sliding along the bars to be discharged by centrifugal force through the enlarged spaces.

FRANK DERBENWICK.
    JAMES F. RYAN, Jr.
    NORMAN C. CALHOUN.

REFERENCES CITED

The following references are of record in the file of this patent:

UNITED STATES PATENTS

| Number | Name | Date |
| --- | --- | --- |
| 242,680 | Nicholson et al. | June 7, 1881 |
| 443,920 | Reed | Dec. 30, 1890 |
| 741,999 | Boulanger | Oct. 20, 1903 |
| 871,517 | McDaniel | Nov. 19, 1907 |
| 950,577 | Nichols | June 7, 1910 |
| 1,097,213 | Crine | May 18, 1914 |
| 1,478,660 | Barnes et al. | Dec. 25, 1923 |
| 1,677,862 | Herrold | July 17, 1928 |
| 2,046,458 | Johnson | July 7, 1936 |
| 2,261,560 | Pellas et al. | Nov. 4, 1941 |
| 2,314,588 | Levinson | Mar. 23, 1943 |